United States Patent [19]

Swemmer

[11] Patent Number: 5,253,964
[45] Date of Patent: Oct. 19, 1993

[54] ROCKBOLT ANCHORING HEAD

[75] Inventor: Theodore D. Swemmer, Transvaal, South Africa

[73] Assignee: Hugo Trustees, Channel Islands

[21] Appl. No.: 864,591

[22] Filed: Apr. 7, 1992

[30] Foreign Application Priority Data

Apr. 22, 1991 [ZA] South Africa .................. 91/2989

[51] Int. Cl.⁵ .................................................. F16B 13/04
[52] U.S. Cl. ............................................. 411/79; 411/354
[58] Field of Search .................. 411/78, 75, 80, 79, 411/354, 55, 24, 347

[56] References Cited

U.S. PATENT DOCUMENTS

| | | | |
|---|---|---|---|
| 1,037,277 | 9/1912 | Martin | 411/75 |
| 2,774,273 | 12/1956 | Olson | 411/78 |
| 3,274,744 | 9/1966 | Blum et al. | 411/24 X |
| 3,358,549 | 12/1967 | Lerich et al. | 411/24 |
| 3,456,551 | 7/1969 | Ishihara | 411/75 |
| 3,528,691 | 9/1970 | Matich, Jr. | 411/80 X |
| 4,515,669 | 5/1985 | Dimond et al. | 411/75 X |
| 4,706,437 | 11/1987 | Boecker, Jr. | 411/75 X |

FOREIGN PATENT DOCUMENTS

| | | | |
|---|---|---|---|
| 208769 | 12/1955 | Australia | 411/55 |
| 933382 | 9/1955 | Fed. Rep. of Germany | 411/75 |
| 857415 | 9/1985 | South Africa . | |
| 769790 | 3/1957 | United Kingdom | 411/75 |

Primary Examiner—Rodney M. Lindsey
Attorney, Agent, or Firm—Ladas & Parry

[57] ABSTRACT

The rockbolt anchoring head comprises a first wedge member with a wedge surface and a passage to receive the rockbolt, and a second wedge member with a complemental wedge surface. The second wedge member is connected to the rockbolt. The wedge surfaces of the first and second wedge members are arranged in slideways relationship with one another, and a spring acts between the members to cause relative slideways movement between the wedge surfaces. In combination, the wedge members form a body which is rectangular in a cross-section taken transversely to the axis of the rockbolt.

6 Claims, 1 Drawing Sheet

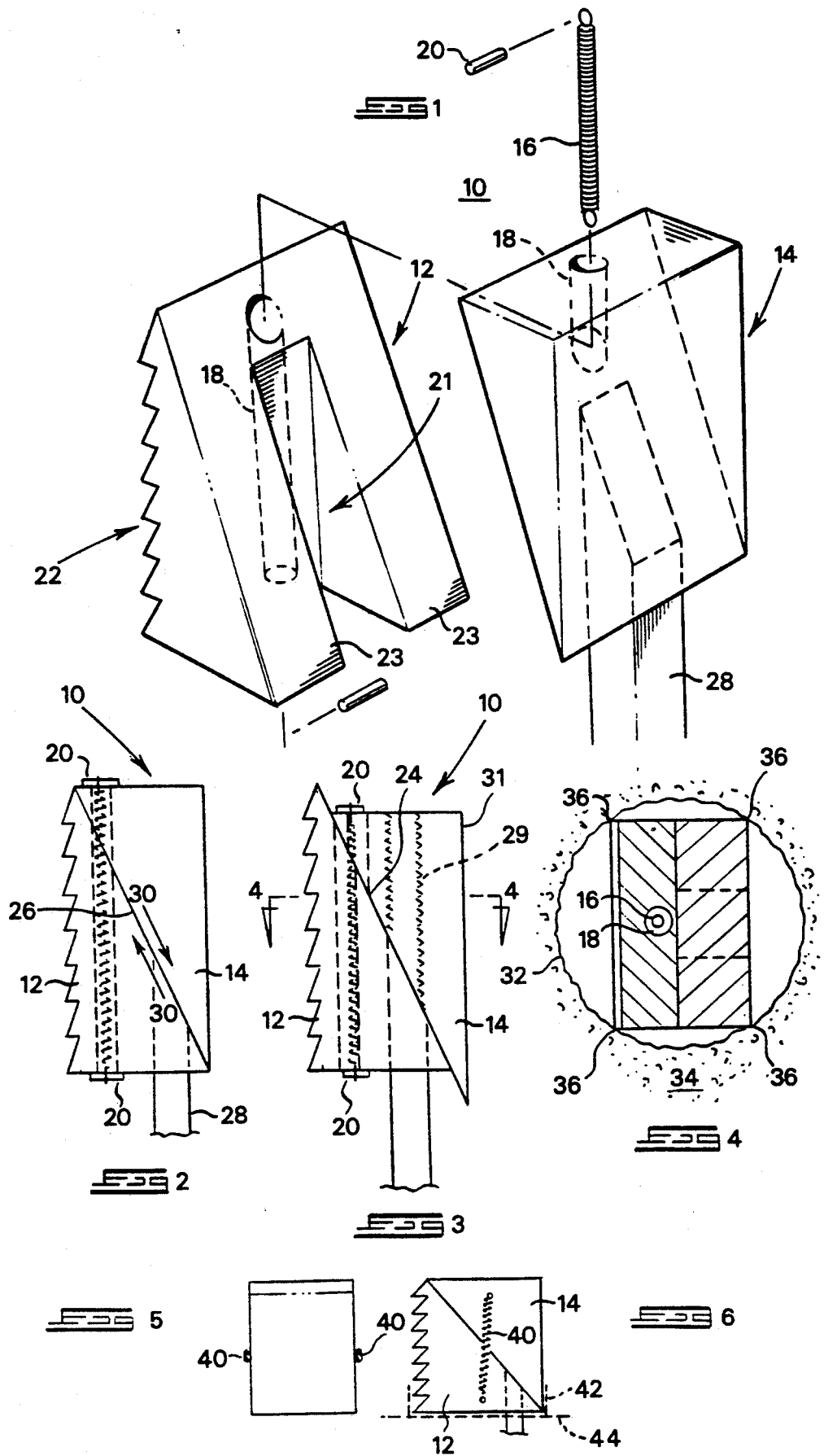

ROCKBOLT ANCHORING HEAD

BACKGROUND TO THE INVENTION

THIS invention relates to a rockbolt anchoring head.

A rockbolt anchoring head is a device used to provide a point anchor for the end of a rockbolt inserted into a drilled hole in a rock formation, typically in underground mining.

SUMMARY OF THE INVENTION

The invention provides a rockbolt anchoring head comprising a first wedge member which has a wedge surface and which is formed with a passage to receive the rockbolt, a second wedge member which has a wedge surface complemental to that of the first wedge member and which is connected or connectable to the rockbolt, the wedge surfaces of the first and second wedge members being arranged in sliding relationship with one another, and biasing means acting between the first and second wedge members to cause relative slideways movement between the wedge surfaces, the wedge members in combination forming a body which is rectangular in a cross-section taken transversely to the axis of the rockbolt.

The first wedge member preferably has a U-shape in cross-section, the rockbolt locating in the passage defined by the arms of the U-shape.

The biasing means can be a tension spring located in passages formed in the wedge members.

Typically, an outer surface of at least the first wedge member has a serrated profile. Typically also, the rockbolt is welded to the second wedge member or has a threaded end engaged in a threaded hole in the second wedge member.

In the preferred embodiment, the rockbolt is in the form of a length of square twist steel or round bar.

BRIEF DESCRIPTION OF THE DRAWINGS

The invention will now be described in more detail, by way of example only, with reference to the accompanying drawings in which:

FIG. 1 shows an exploded perspective view of a rockbolt anchoring head of the invention;

FIG. 2 shows a cross-sectional view of the assembled rockbolt anchoring head in a condition for insertion into a drilled hole;

FIG. 3 shows a similar cross-sectional view of the assembled rockbolt anchoring head in the expanded state; and FIG. 4 shows a cross-sectional view of the rockbolt anchoring head, in operation in a drilled hole, at the line 4—4 in FIG. 3.

FIGS 5, 6 show views of an anchoring head embodying an alternative biasing system.

DESCRIPTION OF EMBODIMENTS

The illustrated rockbolt anchoring head 10 has a first wedge member 12, a second wedge member 14 and a helical tension spring 16. When the components are assembled, as seen in FIGS 2 to 4, the spring passes through aligned passages 18 in the wedge members, with anchoring formations in the form of pins 20 provided at opposite ends of the spring.

The first wedge member 12 has a U-shape in cross-section, as will be apparent from FIGS. 1 and 4 in particular. A passage 21 is formed between the two arms 23 which defined the U-shape. One outer surface 22 of this wedge member is serrated as shown and the wedge member includes a wedge surface 24. Typically the wedge member 12 is a unitary steel casting.

The second wedge member 14 is typically of forged steel construction and presents a wedge surface 26 complemental to the wedge surface 24. In this embodiment of the invention, the wedge member 14 is permanently connected, for instance by welding, to the end of a rockbolt shank 28. In other embodiments, a threaded hole could be formed in the wedge surface 26 to receive a threaded end of the rockbold shank, as indicated in broken outline at 29 in FIG. 2, or the end of the rockbolt shank could be connected to the wedge member in any other suitable manner.

The surface 31 of the second wedge member could have a serrated profile similar to that of the surface 22.

Although shown only diagrammatically, the rockbolt shank (28) in this case is in the form of a length of square twist steel which may be formed with a rolled thread. In other embodiments, the rockbolt shank could, for instance, be in the form of a length of round bar, threaded or unthreaded.

It will be appreciated that in the assembled head 10, with the wedge surfaces 24 and 26 in contact, the action of the spring 16 is to cause sliding movement of the wedge surfaces 24 and 26 one over the other, as indicated in FIG. 2 by the arrows 30. Clearly this action will result in lateral expansion of the head, as will be evident from a comparison of FIGS. 2 and 3.

It will also be noted that, in the assembled head, the rockbolt shank 28 is located in the passage 21 in the first wedge member 12.

In use, a hole 32 (FIG. 4) is drilled into a rock formation 34, typically in a hanging wall in an underground mine, at a location where a rockbolt is required. The head 10 is then laterally contracted by moving the wedge members 12 and 14 to the relative positions seen in FIG. 2, against the bias of the spring 16. In this contracted state, the lateral dimensions of the head 10 are such that it can be inserted into the drilled hole. It will be appreciated that insertion of the head 10 into the drilled hole will be carried out by pushing the rockbolt shank 28 in a direction into the hole and that this pushing action will assist in maintaining the contracted state of the head.

When the desired depth of insertion has been attained, the shank 28 is released. The bias of the spring then causes relative sliding movement to take place between the wedge members 12 and 14, with the result that the head 10 expands laterally into engagement with the sides of the holes 32 as illustrated by FIG. 4. The integrity of the point anchor thus achieved can be enhanced by jerking the shank 28 in the opposite direction, i.e. out of the hole, since this will assist the spring action in expanding the head.

Referring to FIG. 4, it will be noted that the expanded head has a rectangular cross-section and that it makes line contact with the wall of the hole at the four corners 36. The head may in fact have a square shape. A rectangular shape is considered to be a marked improvement over known round cylindrical wedge-type point anchors in which line contact is achieved at two diametrically opposed locations only, since it is anticipated that the greater the degree of contact with the wall of the hole, the firmer the anchor that is achieved.

Further advantages of the illustrated embodiment are seen to reside in the simplicity of the components and the ease with which they can be manufactured.

It will readily appreciated that a spring such as the spring 16 is but one way to achieve the required relative sliding movement between the wedge members, and that various other being systems acting between the wedge members are also possible.

One alternative biasing system is illustrated in FIGS. 5 and 6. In this case, the spring 16 of the first embodiment is replaced by a pair of helical tension springs 40 which span across the interface between the wedge members 12 and 14 and which have their ends anchored, for instance by means of a suitable adhesive or with fasteners, to the sides of the wedge members. In FIG. 6, which corresponds to FIG. 2, the springs are in tension, ready for the anchoring head to be inserted into a hole. Once released, the wedge members move by sliding relative to one another as previously described to achieve an effective point anchorage in the hole.

FIG. 6 also shows, in broken outline, a retainer sleeve 42 which encircles the wedge members to hold the springs 40 temporarily in the tensioned state prior to insertion in the hole. The sleeve 42 is mounted on a base 44 and is larger than the mouth of the hole. When the anchoring head is moved into the hole, the sleeve abuts the mouth of the hole and falls free.

I claim:

1. A rockbolt anchoring head comprising a first wedge member which has "a wedge surface, the first wedge member having a U-shape in cross section and being formed with a passage defined by the arms of the U-shape for receiving a" rockbolt, a second wedge member which has a wedge surface complemental to that of the first wedge member and which is connectable to the rockbolt, the wedge surfaces of the first and second wedge members being arranged in sliding relationship with one another, and biasing means acting between the first and second wedge members to cause relative sliding movement between the wedge surfaces, the wedge members in combination forming a body which is non-circular in a cross-section taken transversely to the axis of the rockbolt.

2. A rockbolt anchoring head according to claim 1 wherein the second wedge member has "a threaded hole for receiving a threaded end of the rockbolt."

3. A rockbolt anchoring head according to claim 1 wherein the biasing means is a tension spring located in passages formed in the wedge members.

4. A rockbolt anchoring head according to claim 1 wherein the biasing means is a pair of tension springs arranged across the wedge surfaces of the wedge members and acting between members.

5. A rockbolt anchoring head according to claim 1, wherein the non-circular body formed by the combined wedge members provides four corners for multiple line engagement with a side wall of a hole into which the anchoring head is inserted.

6. A rockbolt anchoring head according to claim 1 further comprising a removable retainer sleeve which encircles the wedge members temporarily to prevent relative sliding movement between the wedge members prior to insertion of the anchoring head in a hole.

* * * * *